Oct. 9, 1934.    J. B. STRAUSS    1,975,907
MOTION PICTURE REPRODUCING APPARATUS
Filed Feb. 28, 1930    4 Sheets-Sheet 4
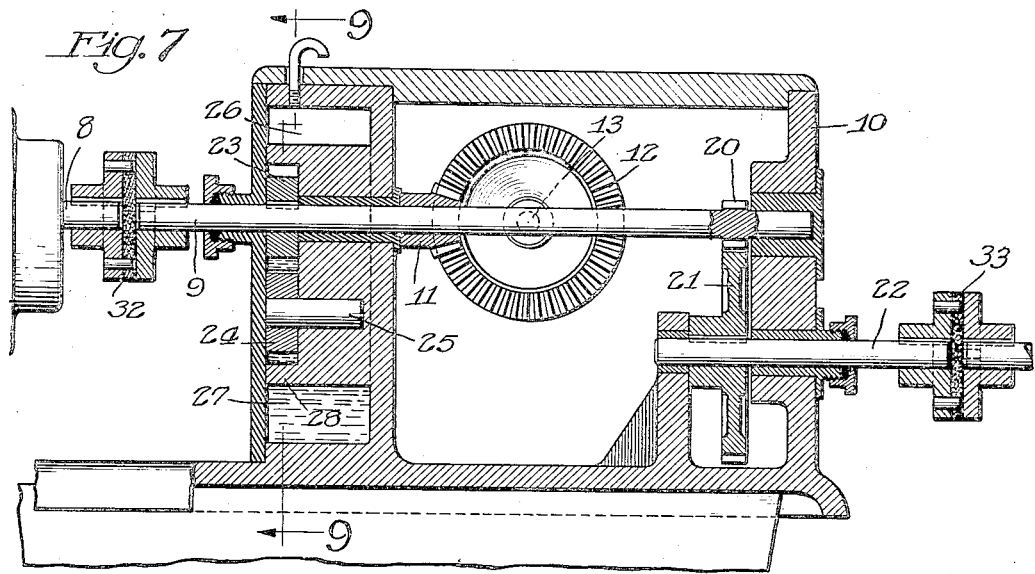
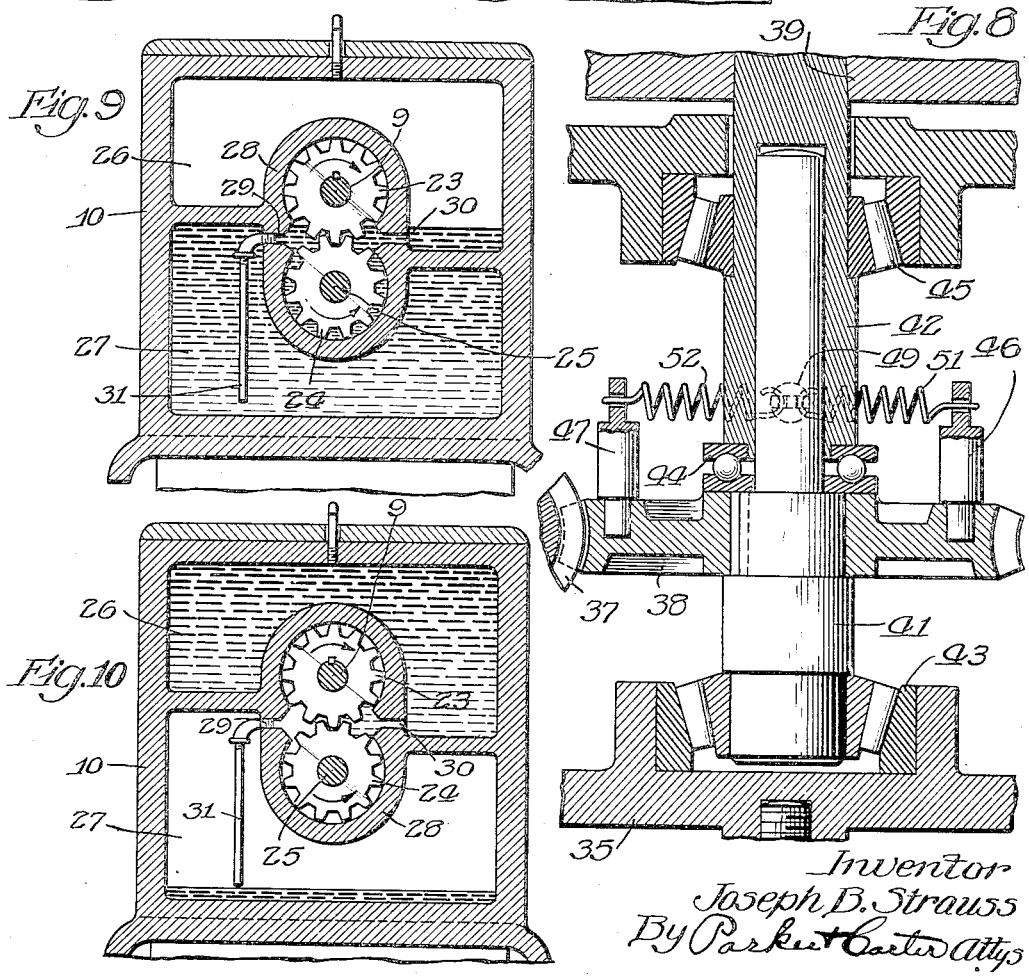
Inventor
Joseph B. Strauss
By Parker & Carter Attys Patented Oct. 9, 1934

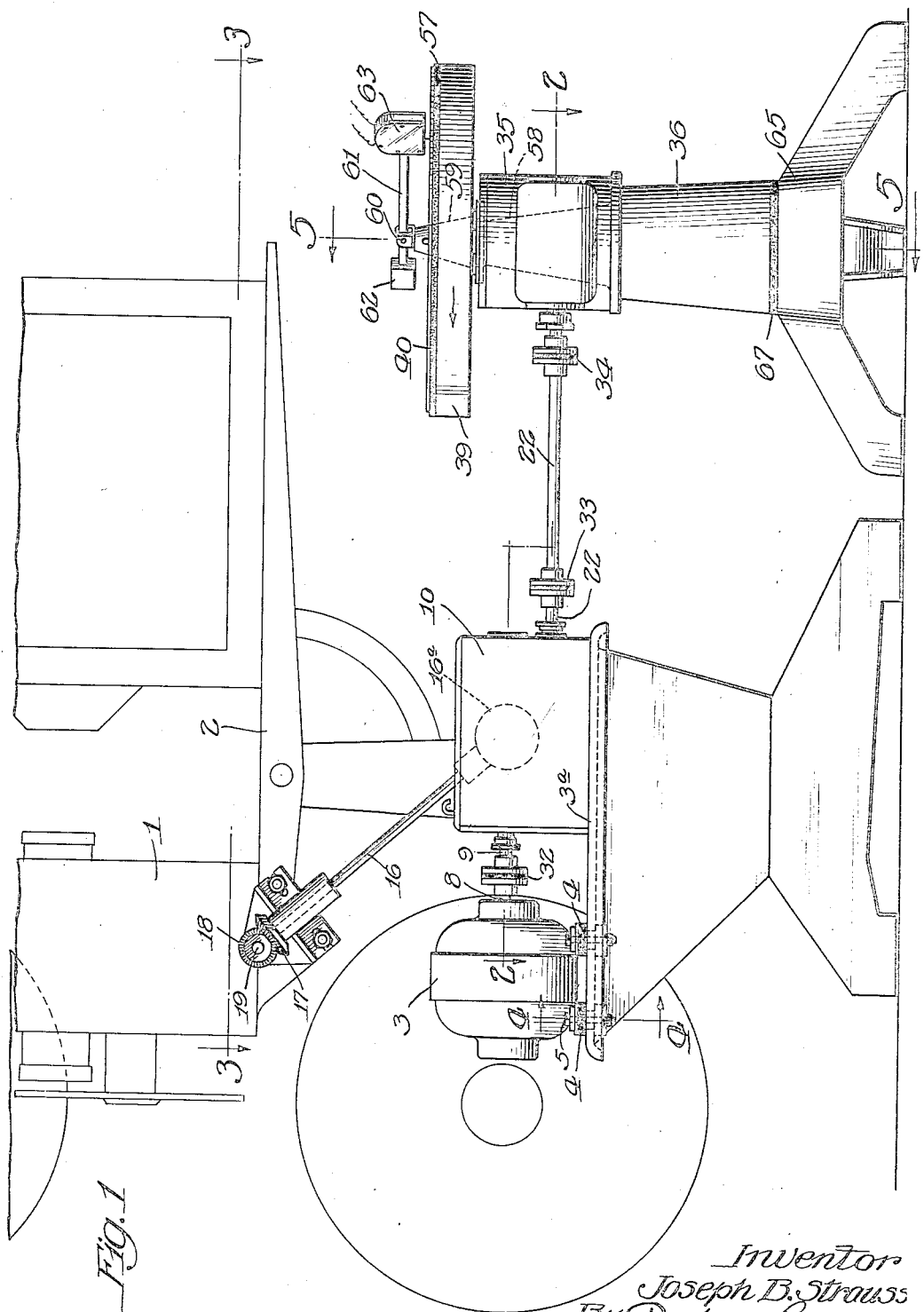

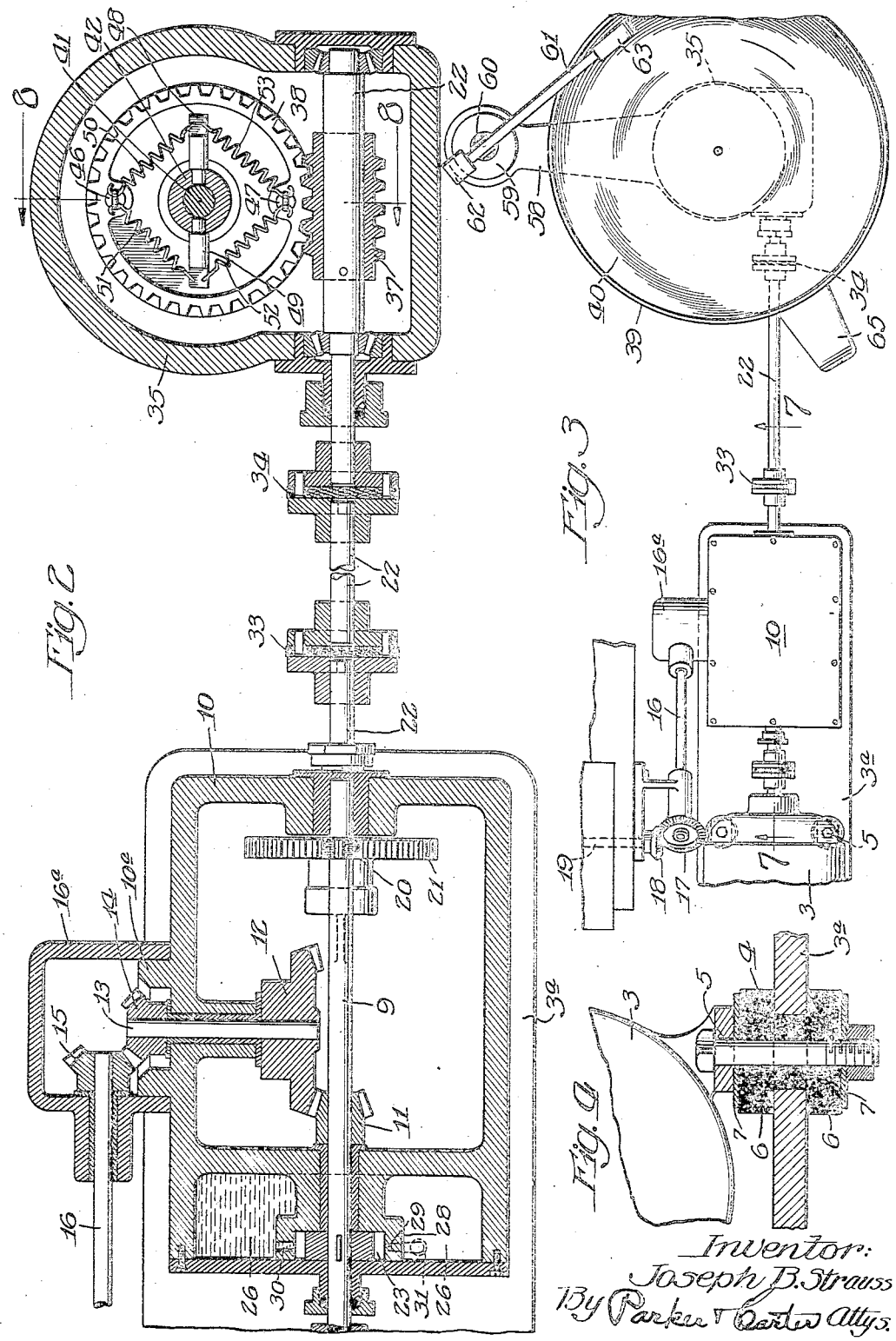

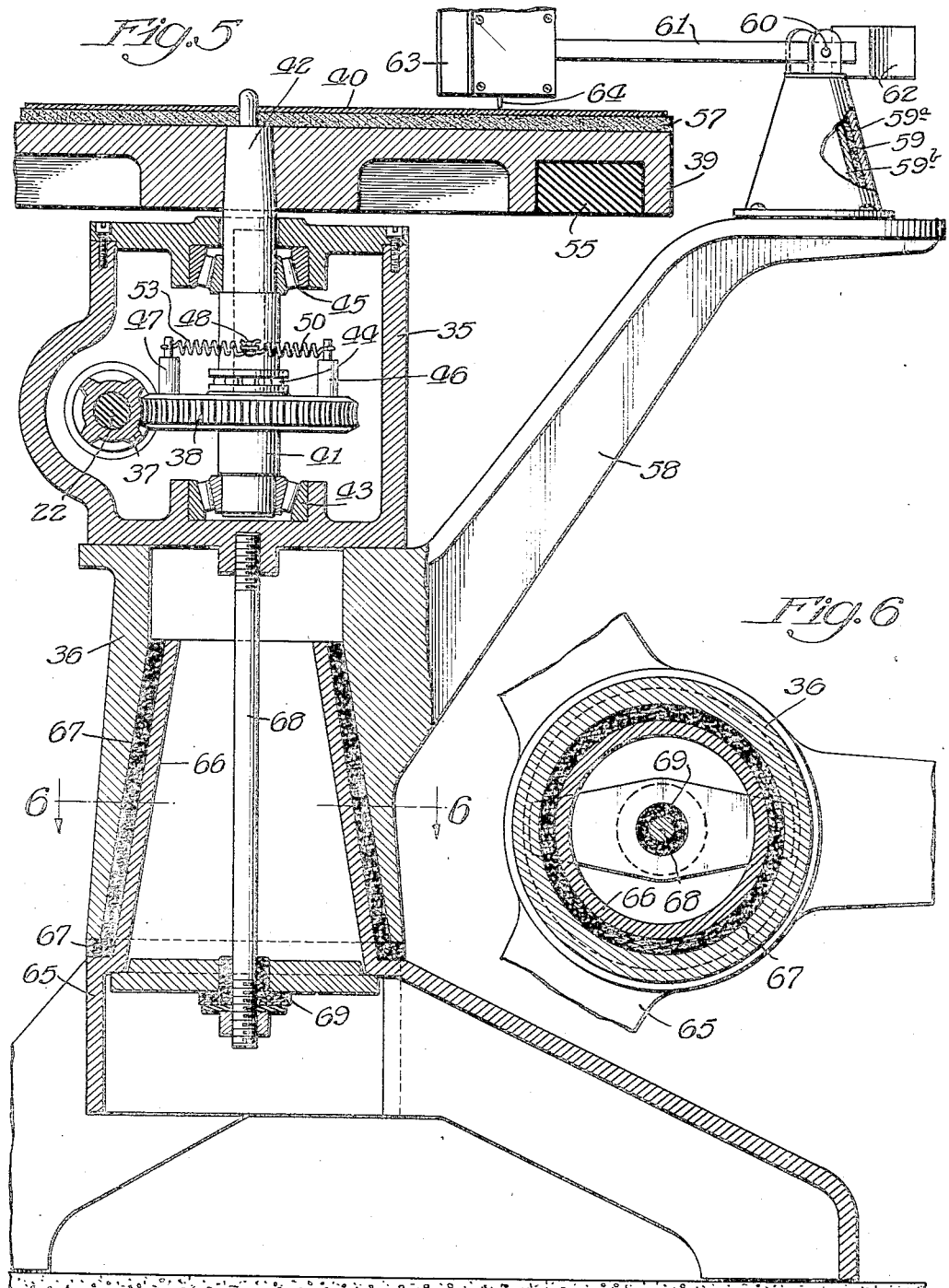

1,975,907

UNITED STATES PATENT OFFICE 1,975,907

MOTION PICTURE REPRODUCING APPARATUS

Joseph B. Strauss, Chicago, Ill.

Application February 28, 1930, Serial No. 432,194

3 Claims. (Cl. 88—16.2)

This invention relates to motion picture reproducing apparatus and has for its object to provide a new and improved device of this description.

The invention has as a further object to provide a reproducing apparatus of this nature which will maintain synchronism of the picture and the picture record.

The invention has as a further object to provide a device of this description which shall eliminate the external noises and prevent interference of outside noises with the proper reproduction of the talking record.

The invention has as a further object to provide a simplifying accurate and efficient reproducing apparatus in which vibration of the mechanism does not interfere with the operation.

The invention has further objects which are more particularly pointed out in the accompanying description.

Referring now to the drawings, Fig. 1 is a side elevation showing one form of device embodying the invention.

Fig. 2 is a sectional view taken on line 2—2 of Fig. 1.

Fig. 3 is a sectional view taken on line 3—3 of Fig. 1.

Fig. 4 is an enlarged sectional view taken on line 4—4 of Fig. 1.

Fig. 5 is an enlarged sectional view taken on line 5—5 of Fig. 1.

Fig. 6 is a sectional view taken on line 6—6 of Fig. 5.

Fig. 7 is an enlarged sectional view taken on line 7—7 of Fig. 3.

Fig. 8 is an enlarged sectional view taken on line 8—8 of Fig. 2.

Fig. 9 is a sectional view taken on line 9—9 of Fig. 7.

Fig. 10 is a view similar to Fig. 9 showing the liquid in the upper chamber.

Like numerals refer to like parts throughout the several figures.

The apparatus comprises a turntable assembly mounted upon a pedestal adjacent to the projecting machine with a system of shafting flexible couplings and reduction gears from the turntable assembly to the projecting machine and an operating source connected with the system, the arrangement being such that the disc rotates at a definite speed relation with the picture projector. In the machines of this class, difficulty has been encountered in the faithful production of sound. In connection with pictures, lack of uniform speed of the moving parts, excessive vibration and failure of synchronization have been the main difficulties that have been encountered. Irregular speed of the rotating disc causes an apparent discord due to the change in pitch of the reproduced tone.

Any vibration of the mechanism will be transmitted to the pick up, that is the mechanism associated with the needle of the sound record, and will alter the desired wave form. Failure of the projecting machine and the recording to maintain synchronism causes the sound to get ahead of or behind the picture.

In the device herein described, these vital defects have been removed and in addition compactness and simplification have been effected through the construction employed thus producing an apparatus more perfect in operation and requiring a minimum space and being low in first cost and economical to maintain.

Associated with the apparatus is a filter mechanism and a dampening mechanism all of which is hereinafter described.

Referring now to the drawings, I have shown a motion picture projector 1 mounted upon a suitable support 2. A driving motor 3 for the apparatus is mounted upon a support 3ª which is a bracket mounted on the projector support. The connection between the motor and the support is such as to eliminate the sound produced by the motor and prevent it from affecting the talking record. This result is secured by providing proper sound deadening material 4 arranged in the connection between the motor and the support 3ª.

In the construction shown, this material surrounds each of the fastening devices or bolts 5 for the motor and fills an enlarged hole in the support 3ª and is provided with enlarged ends 6, the construction being such that the fastening devices 5 make no direct contact with the support 3ª, there being interposed between these fastening devices and the support this sound deadening material.

I prefer to provide washers 7 at the ends of the sound deadening material, as shown in Fig. 4. I may use for this purpose felt and leather washers which constitute a vibration absorption device of extreme importance in securing smooth motion in the working parts and in eliminating vibration. The motor shaft 8 of the motor is connected with a shaft 9 of the gear box 10. Within the gear box 10 is a beveled pinion 11 on the shaft 9 which engages a beveled gear 12 on a shaft 13. The shaft 13 has a beveled gear 14 which engages a beveled gear 15 on a shaft 16 which is connected to the motion picture projector 1 in any suitable manner, as by means of the beveled gear 17 on the shaft 16 which connects beveled gear 18 on the driving shaft 19 of the motion picture projector. The shaft 9 is mounted in suitable bearings and is provided with a pinion 20 which engages a gear 21 on a shaft 22. The gears for the several shafts are so designed that the proper speed reduction is given to each of these shafts.

The connection of the shaft 16 to shaft 9 is such that the position of said shaft may be varied to adjust itself to the various positions of the projector. The housing 16a in which the pinion 15 has its bearing is rotatably mounted upon the projection 10a, on the gear box thus giving the shaft 16 a free range of movement and permitting it to be driven in all of its various positions. Some suitable speed retarding device is provided which serves to prevent excess strain on the filter mechanism of the turntable assembly and on the projector mechanism.

In the particular construction shown, this speed retarding device comprises a small gear pump driven from the shaft 9. One of the gears 23 of the pump is on the shaft 9 and the other gear 24 is on the shaft 25, the gears meshing, as shown in Figs. 7, 9, and 10. Associated with the pump are the two chambers 26 and 27. The gears are enclosed in a casing 28 which is provided with the admission and discharge openings 29 and 30. Connected with the opening 29 is a pipe 31 which extends to a point near the bottom of the chamber 27. When the motor is first started up the liquid, which is preferably oil of the proper viscosity to secure the desired results, is in the chamber 27 (see Fig. 9). The operation of the motor causes the pump gears to transfer the oil from chamber 27 to chamber 26 (see Fig. 10). The pump is arranged so that when the motor reaches full speed, the transfer of oil is stopped. In this way, the power of the motor is checked and controlled until it reaches full speed. When the motor stops, the oil in the chamber 26 returns to the chamber 27 through the openings 30, 29 and the pipe 31. The gear box 10 may be integral with the support upon which the driving motor is mounted so that the entire unit may be removed or attached to the main bracket as a whole.

Interposed between the motor and the gear box 2 is a flexible coupling 32. The shaft 22 is provided with two flexible couplings 33 and 34. These couplings absorb shock and irregularities in motion and speed and perform an important function in connection with the other parts to secure smooth and synchronous movement. The shaft 22 projects into a gear box 35 mounted upon the support or pedestal 36 of the turntable assembly. The shaft 22 has bearings in the gear box and is provided with a worm 37 which engages a worm gear 38. The worm gear 38 is arranged so as to drive the turntable 39 carrying the sound disc 40 by means of a two part shaft, said shaft having a lower section 41 and the upper section 42. The section 41 is mounted in a cup bearing 43 in the bottom of the gear box 35. The section 42 of the shaft is mounted so as to rotate freely on the section 41 and there is a thrust bearing 44 between them. The section 42 is provided with a bearing 45 and projects beyond said bearing and is connected with a rotating disc or turntable 39.

The worm gear 38 is connected with the section 41 of the shaft. The two sections of the shaft are flexibly or elastically connected together. This is accomplished in the drawings by providing the worm gear 38 with the pins 46 and 47. The section 42 of the shaft is provided with the pins 48 and 49, the four pins being preferably set ninety degrees apart, as shown in Fig. 2. The pins 46 and 47 are connected to the pins 48 and 49 by the springs 50, 51, 52, and 53. The turntable or disc 39 is preferably made of two metals, the main disc being preferably of a light metal and being provided with an annulus or ring 55 of heavy metal so attached as to properly weight the disc to secure the exact inertia required for uniform motion (see Fig. 5). Mounted upon the disc 39 is a sound record 40 adapted to the picture film to be projected. Interposed between the sound record and the disc is a layer of material 57 to prevent slippage between the sound record and the disc. I have found that sponge rubber is very effective for this purpose. The pedestal 36 is provided with an arm 58 which provides a suitable support for the pick up mechanism. At the top of this arm is a cup shaped part 59 into which fits a similar cup or conical shaped part 39b, there being shock absorbing material 59a interposed between the two. A pin 60 is connected with the inner part and a pick up arm 61 is mounted thereon having at one end a weight 62 and at the other end the usual electro-magnetic unit 63 and the needle 64 which engages the sound record 40. This device known as a pick up comprises the usual electromagnetic unit in association with the needle which translates the inner action of the needle and the sound grooves of the sound record into audible sound which is then transmitted and amplified through suitable amplifiers and speakers and carried to the ears of the hearers. The construction of the two shaft sections 41 and 42 and the connection between them is a highly important construction for the purpose of absorbing the irregularities of the operating mechanism and allowing the parts to take up any small motion due to the inertia of the disc. This beneficial effect is increased by the duplex arrangement of the shaft. The friction of the two parts of the shaft on each other have a dampening effect.

The pedestal 36 is mounted upon a base 65. This base has a conical shaped portion 66 which projects into a similar opening in the pedestal 36 and there is interposed between them a sound deadening material 67 (see Fig. 5). The base 65 is connected to the gear box 35 by the rod 68 and there is a noise preventing or shock absorbing material 69 interposed between the rod 68 and the base 65. The material 67 and 69 may be of rubber or felt or any other material which will filter out and prevent the parts from interfering with the proper action of the device.

In the use of the device the parts are assembled as shown with the picture film in the picture projecting apparatus and the sound record in position on the disc or turntable 54. The motor 2 is then set in operation so as to operate the motion picture projection machine and the sound reproducing apparatus. The construction herein shown remedies the defects heretofore present, as hereinbefore set out and an efficient device wherein the sound is synchronous with the picture and the external noises and vibrations excluded, is produced. The electromagnetic unit 63 is of any of the ordinary forms now used in connection with talking motion pictures.

I claim:—

1. In a reproducing apparatus for sound motion pictures an actuating mechanism comprising a motor, a gear reduction box, a turntable assembly for reproducing sounds, a projector for projecting pictures, a horizontal shaft from the motor, a second horizontal shaft from the turntable assembly, the axes of these two shafts separated and an angular shaft associated with the horizontal shafts, said angular shaft connecting with the projector, the connection between the three shafts effected through said gear reduction box, and a speed retarding device in said box acting in synchronism with said shafts, thus taking up the slack of the parts.

2. The combination with a motion picture projector of a motor assembly mounted in proximity to the projector and a turntable assembly separately mounted on a pedestal, an actuating mechanism connecting the two and also connecting to the projector and a common gear reduction box included in said actuating mechanism, means associated with the motor for absorbing vibration, means associated with the gear reduction box of said actuating mechanism for retarding speed and preventing excess strain on the parts, and means associated with the turntable assembly for maintaining a constant peripheral speed of the turntable assembly.

3. In a reproducing apparatus for sound motion pictures an actuating mechanism comprising a motor, a turntable, a direct drive shaft connecting said motor with said turntable and said projector, a speed changing device at the end of said shaft, said device mounted in proximity to the projection machine at the drive shaft and connecting thereto, said device comprising three gears, two mounted on a common shaft and a third at right angles to said shaft and meshing with one of the other two gears, a shaft with which said third gear is connected, a driven shaft driven therefrom operatively connected with said projector, said driven shaft adapted to be rotated in a vertical plane about the axis of the shaft which drives it.

JOSEPH B. STRAUSS.